United States Patent
Wei

[19]

[11] Patent Number: 6,109,632
[45] Date of Patent: Aug. 29, 2000

[54] FRONT WHEEL DOUBLE SUSPENSION TRIANGLE FRAME FOR FOUR-WHEEL DRIVE AUTOMOBILE

[76] Inventor: Jimmy Wei, No. 10-601, Mei-Kang 1st Road, Hsin-Tien City, Taipei Hsien, Taiwan

[21] Appl. No.: 09/129,926

[22] Filed: Aug. 6, 1998

[51] Int. Cl.$^7$ ........................................ B60G 7/00
[52] U.S. Cl. .......................... 280/124.138; 280/124.136; 280/124.141
[58] Field of Search ................. 280/124.136, 124, 280/138, 124.139, 124.141, 124.142, 124.135, 93.511, 93.512

[56] References Cited

U.S. PATENT DOCUMENTS

| | | | |
|---|---|---|---|
| 2,205,981 | 6/1940 | Klages | 280/93.511 |
| 2,771,302 | 11/1956 | Booth et al. | 280/93.512 |
| 3,039,787 | 6/1962 | Meyer | 280/124.136 |
| 3,118,687 | 1/1964 | Forbush | 280/124.136 |
| 3,209,851 | 10/1965 | Collins | 280/124.142 |
| 5,026,090 | 6/1991 | Sekino | 280/124.136 |
| 5,496,055 | 3/1996 | Shibahata et al. | 280/124.139 X |
| 5,662,348 | 9/1997 | Kusama et al. | 280/124.135 X |
| 5,868,410 | 2/1999 | Kawabe et al. | 280/124.138 X |

OTHER PUBLICATIONS

J.C. Whitney Catalog 462B pp. 64,65 and 180, 1985.

*Primary Examiner*—Brian L. Johnson
*Assistant Examiner*—Bryan Fischmann
*Attorney, Agent, or Firm*—Bucknam and Archer

[57] ABSTRACT

A front wheel double suspension triangle frame for four-wheel drive automobile having a z shaped double layered triangle frame, a lower platform of which is connected with a shock absorber and the outer end thereof is secured onto a joint of a lower seat on a spindle knuckle of a hub, a short ratchet arm and a long ratchet arm are formed on the inner end of the above end face to extend upward obliquely at the same angle of elevation and pivotally connected with a beam so as to raise the chassis; an upper triangle frame pivoted on the seat of the automobile body; and a steering joint equal to the height between the upper and lower end of the lower triangle frame and pivoted between the steering joint of the upper triangle frame and an upper seat of the spindle knuckle of the hub for the upper and lower triangle frame to keep them horizontal.

14 Claims, 6 Drawing Sheets

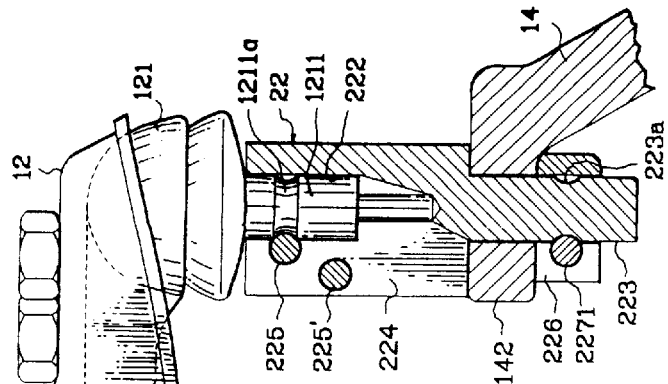
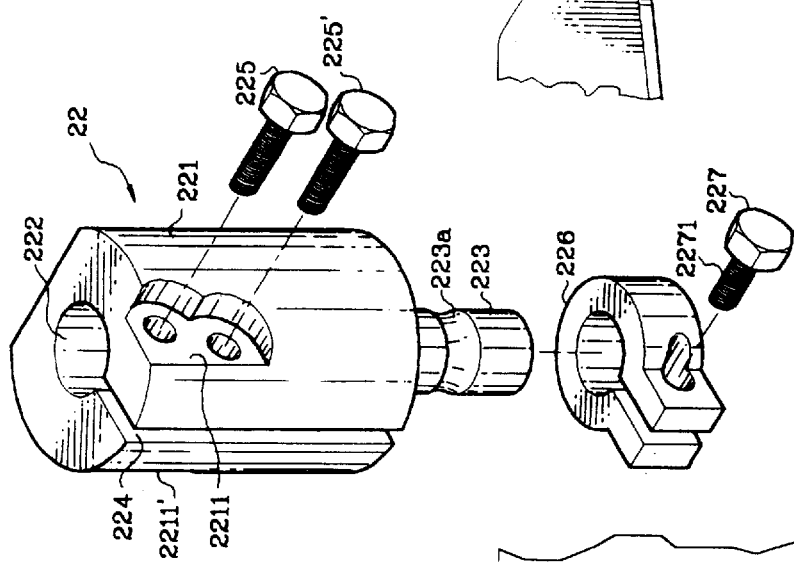
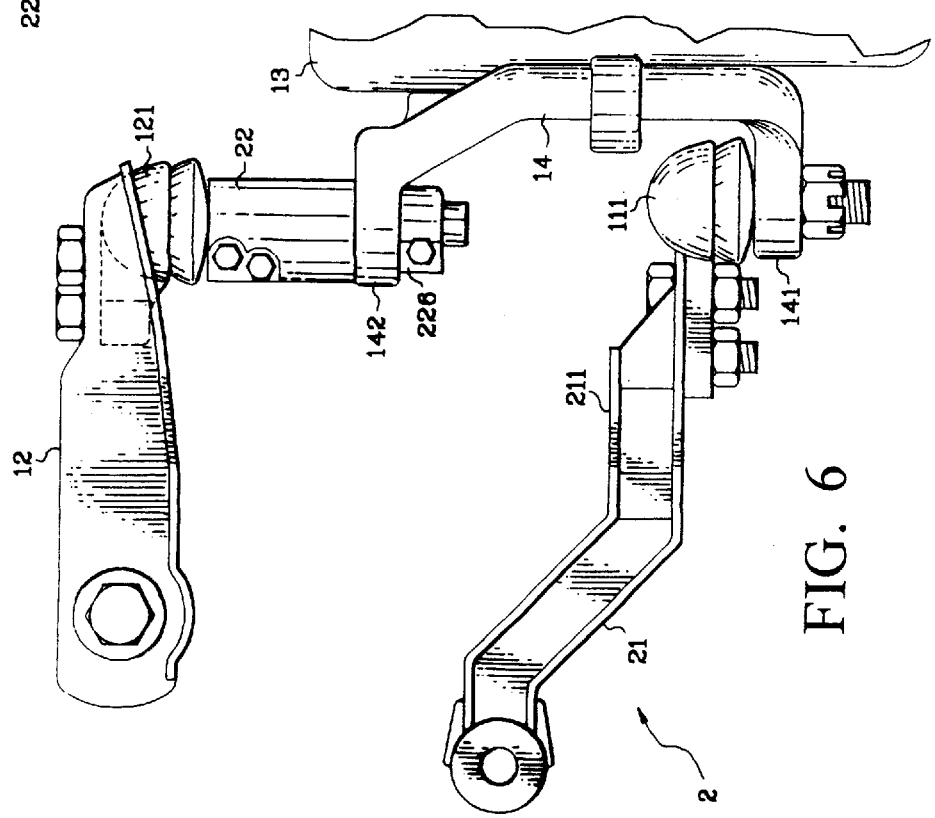

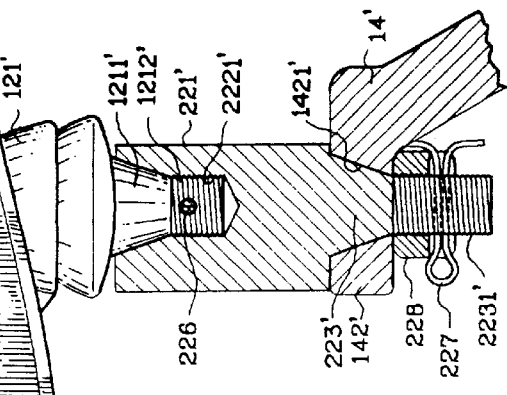
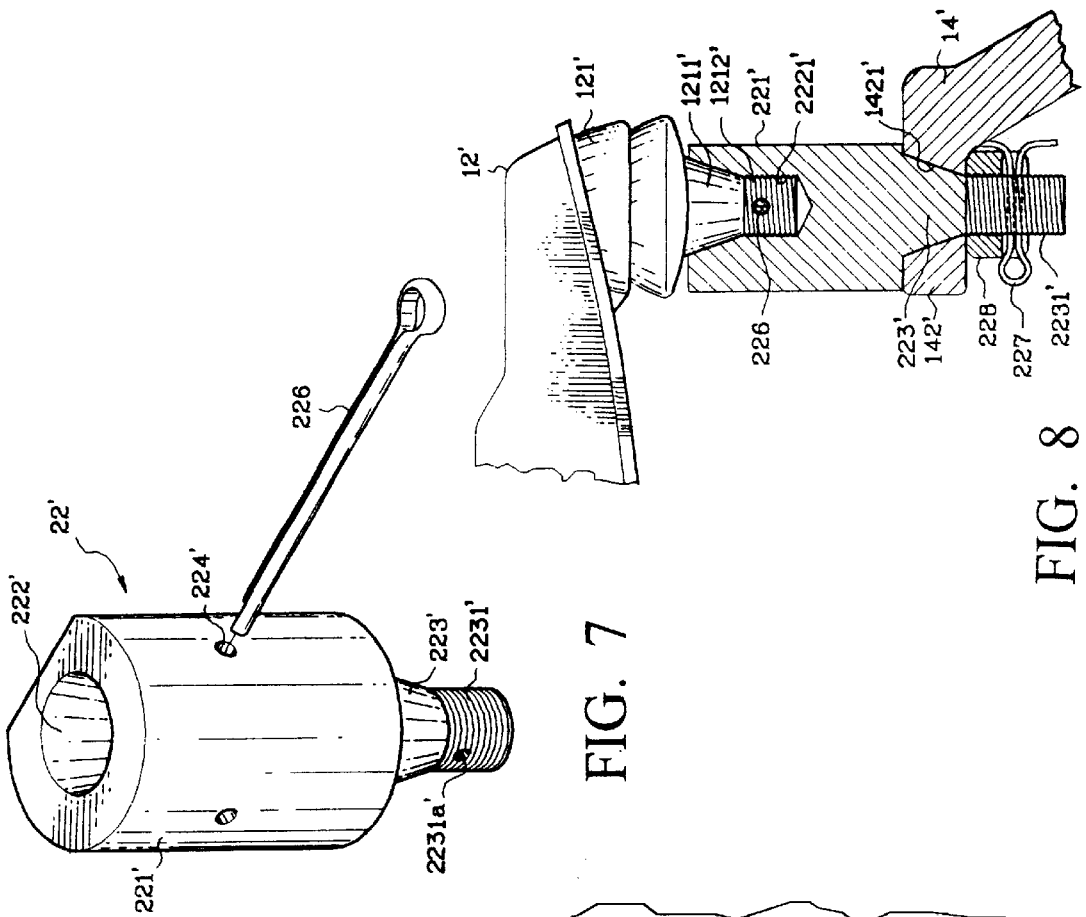
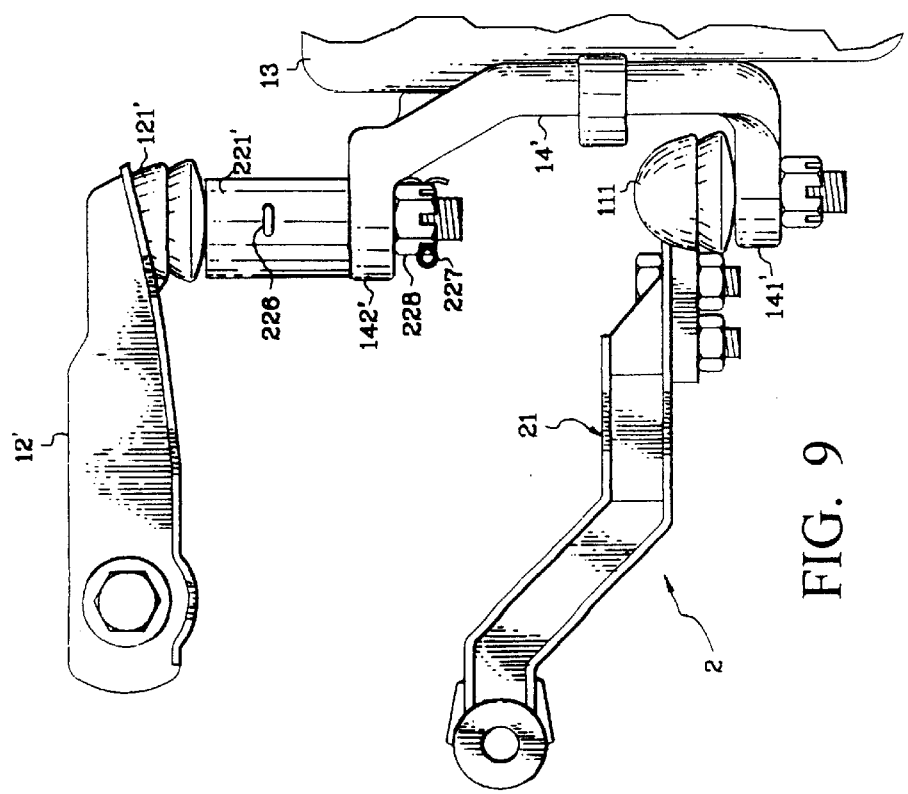
FIG. 7
FIG. 8
FIG. 9

FRONT WHEEL DOUBLE SUSPENSION TRIANGLE FRAME FOR FOUR-WHEEL DRIVE AUTOMOBILE

FIELD OF THE INVENTION

This invention relates to a front wheel double suspension triangle frame for four-wheel drive automobile, particularly to a construction having a Z shaped double layered lower triangle frame to support the chassis and the automobile body thereof, and a steering joint disposed between the lower triangle frame and an upper triangle frame to keep them horizontal, whereby the chassis and the automobile body may be raised and the stability of the automobile operation is obtainable without altering the displacement of the shock absorber and the upper triangle frame.

DESCRIPTION OF THE PRIOR ART

The front wheel double suspension triangle frame conventionally referred as double A arms for four-wheel drive vehicle has a left wheel and a right wheel symmetric to each other. As shown in FIGS. 1a and 1b, a lower triangle frame and an upper triangle frame are horizontally mounted between the chassis and the front wheel. For brevity, the right wheel is taken as a representative example for description. As shown in the drawing, the outer ends of the lower triangle frame 11 and the upper triangle frame 12 of the conventional four-wheel drive vehicle 1 are respectively pivoted on a lower seat and an upper seat of a spindle knuckle of a hub by means of steering joints 111, 121 while the inner ends thereof are pivoted on the bottom and the beam of the automobile body so as to be able to swing up and down synchronically. The lower end of a shock absorber 15 is attached to the end face of the lower triangle frame 11, while the upper end of the shock absorber 15 is secured onto a seat on one side of the automobile body. Thus the lower triangle frame 11 and the upper triangle frame 12 support the weight of the front portion of the automobile body and the shock of the front wheel in correspondence to the road condition to maintain the stability of the automobile operation and the comfortability thereof.

In order to improve the ability of the automobile to travel cross country or off-road in adapting to the unevenness of the road, a wheel having a greater diameter is used instead of the standard wheel whereby the chassis 1b and the automobile body 1a may be raised in relation to the road. In order to replace with a larger diameter wheel, the distance between the upper triangle frame 12 and the lower triangle frame 11 of the chassis 1b and the suspension system must be increased. The structure of the means presently used as shown in FIG. 1b is connected with a cross arm 16 between the chassis and the seat 1c on which the lower triangle frame 11 is pivoted, and the lower triangle frame 11 is pivoted on the cross arm 16 to lower the height (-Hb') of the lower triangle frame 11. Simultaneously, the seat 1d for the automobile body and or which the triangle frame 12 is pivotally connected is lowered for the distance (-Hc') between the automobile body 1a and the upper triangle frame 12 whereby a wheel having a larger diameter may be mounted. It is apparent from the above that the height (H') obtained by the conventional art in raising the automobile body and the chassis is approximately equals to the result of the sum of (-Hb') and (-Hc') of the lower or upper triangle frame or the height difference (Ha') of the tire diameter. Hence, the effect of the height increasing is limited. Alternatively, to improve the effect in raising the chassis and the automobile body, the torsion bars (not shown) which are parallel to the automobile body and perpendicular to the upper and lower triangle frame are pressed at the outer ends thereof for the upper and lower triangle frame on both ends of the front wheel to spread into a "/ \" shape whereby the automobile body rises and the height of the chassis is increased. However, this will seriously effect the stability of automobile operation. Particularly when the automobile driven on an uneven road it is subjected to an up-and-down vibration or when the automobile makes too sharp a turn it is subjected to a great centrifugal force, the upper and lower triangle frame are at the risk of being broken.

SUMMARY OF THE INVENTION

In view that the conventional art is ineffective in raising the automobile body and the chassis since the result is that the operation is unstable and the upper and lower triangle frame are at the risk of being broken, one object of this invention is to provide a front wheel double suspension triangle frame for four-wheel drive automobile to effectively raise the automobile body and the chassis without altering the arrangement of the shock absorbing system and the upper triangle frame.

As shown in FIG. 2a, an embodiment of this invention comprises a lower triangle frame 21 bent from the outer side to form a double layered Z shape. A lower platform of the lower triangle frame 21 is connected with the lower end of a shock absorber 15, while the outer end of the lower triangle frame is secured on a steering joint 111 of a lower seat on a spindle knuckle 14 of a hub 13. A short ratchet arm and a long ratchet arm are formed on the inner end of the above end face to extend obliquely upward at the same angle of elevation to pivotally connect with a seat 1c of the beam whereby a chassis 1b is raised. A spacer 22 having a height (Hc) the same as the height (Hb) between the upper and lower platforms of the lower triangle frame 21 is pivoted between a steering joint 121 of the upper triangle frame 12 and an upper seat on the spindle knuckle 14 of the hub 13 for the upper and lower triangle frame to keep horizontal. As described above, the height (H) in raising the automobile body and the chassis by means of a device 2 of this invention approximately equals the result of the height (Ha) increase in the tire diameter which is approximately equal to the height (Hb) between the upper and lower platforms of the lower triangle frame 21 added to the height (Hc) of the spacer.

Another object of this invention is to provide a lower triangle frame which is formed by using a laser to precisely cut a steel plate into an upper layer plate and a lower layer plate, and then inserting a plurality of longitudinal steel plates between the above plates and soldering them into H shaped structure which is more reinforced and durable than the conventional art formed by molding and lower in cost.

A BRIEF DESCRIPTION OF THE DRAWINGS

Other objects, features and advantages of this invention are better to be understood from the following description of the preferred embodiment made with reference to the accompanied drawing, wherein:

FIG. 1a partially schematically illustrates a conventional front wheel double suspension triangle frame for four-wheel drive automobile;

FIG. 1b partially schematically illustrates conventional means to raise the automobile body and the chassis wherein the height of the upper and lower triangle frame is lowered to allow the mounting of a tire increased in diameter;

FIG. 2a is a schematic view, showing a four-wheel drive automobile, of means to raise the automobile body and the chassis according to this invention in comparison with these before replacement;

FIG. 2b partially illustrates means to raise the automobile body and the chassis according to this invention;

FIG. 3b is a front view of the lower triangle frame as shown in FIG. 3a;

FIG. 4 is an exploded perspective view of a spaced utilized according to this invention;

FIG. 5 partially illustrates an arrangement of the spacer as shown in FIG. 4, a steering joint of the upper triangle frame and a spindle knuckle;

FIG. 6 is a schematic view of an arrangement as shown in FIG. 5;

FIG. 7 is an exploded perspective view of another spacer utilized according to this invention;

FIG. 8 partially illustrates an arrangement of a spacer as shown in FIG. 7, a steering joint of the upper triangle frame and the spindle knuckle; and FIG. 9 is a schematic view of another arrangement as shown in FIG. 8.

DETAILED DESCRIPTION OF THE PREFERRED EMBODIMENTS

Figure 1A:
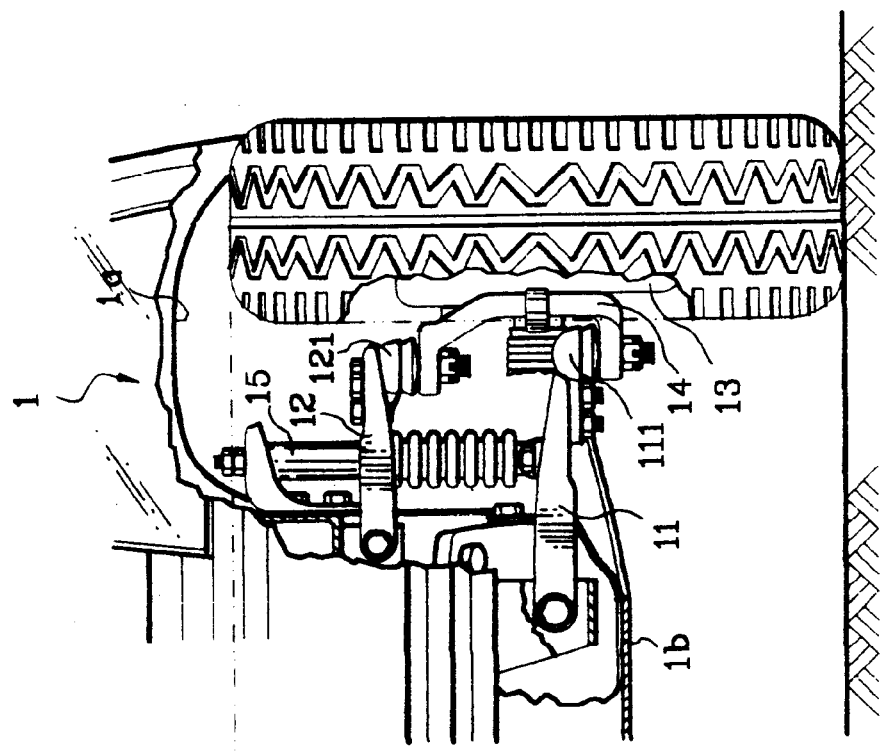
Figure 1B:
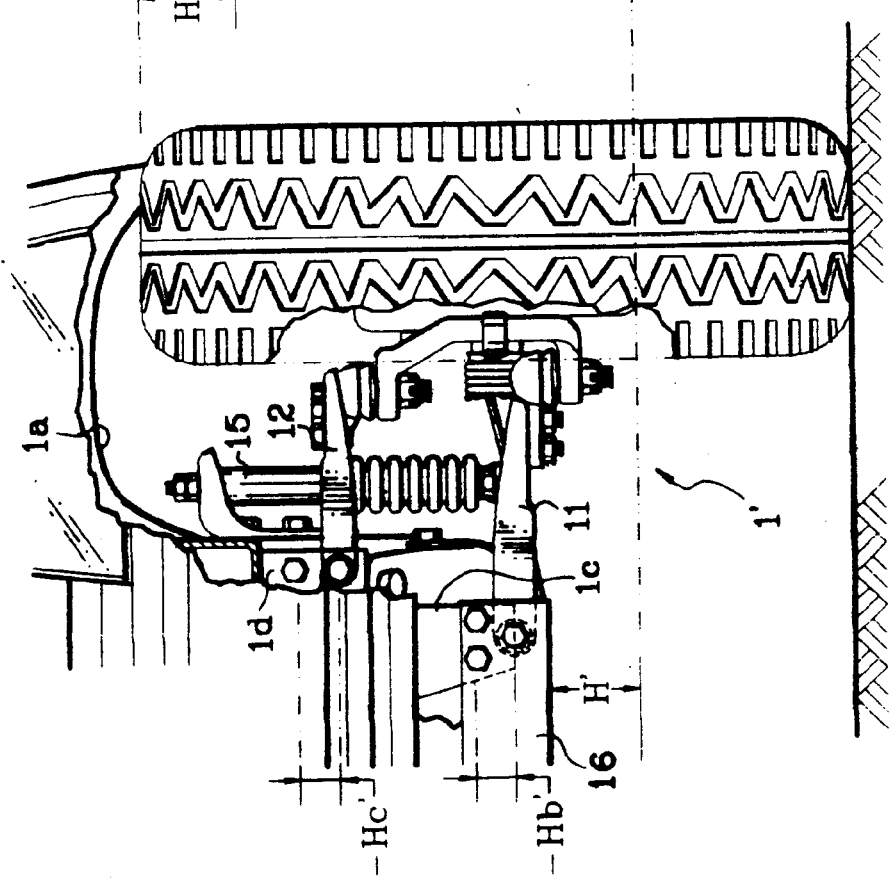
Figure 2A:
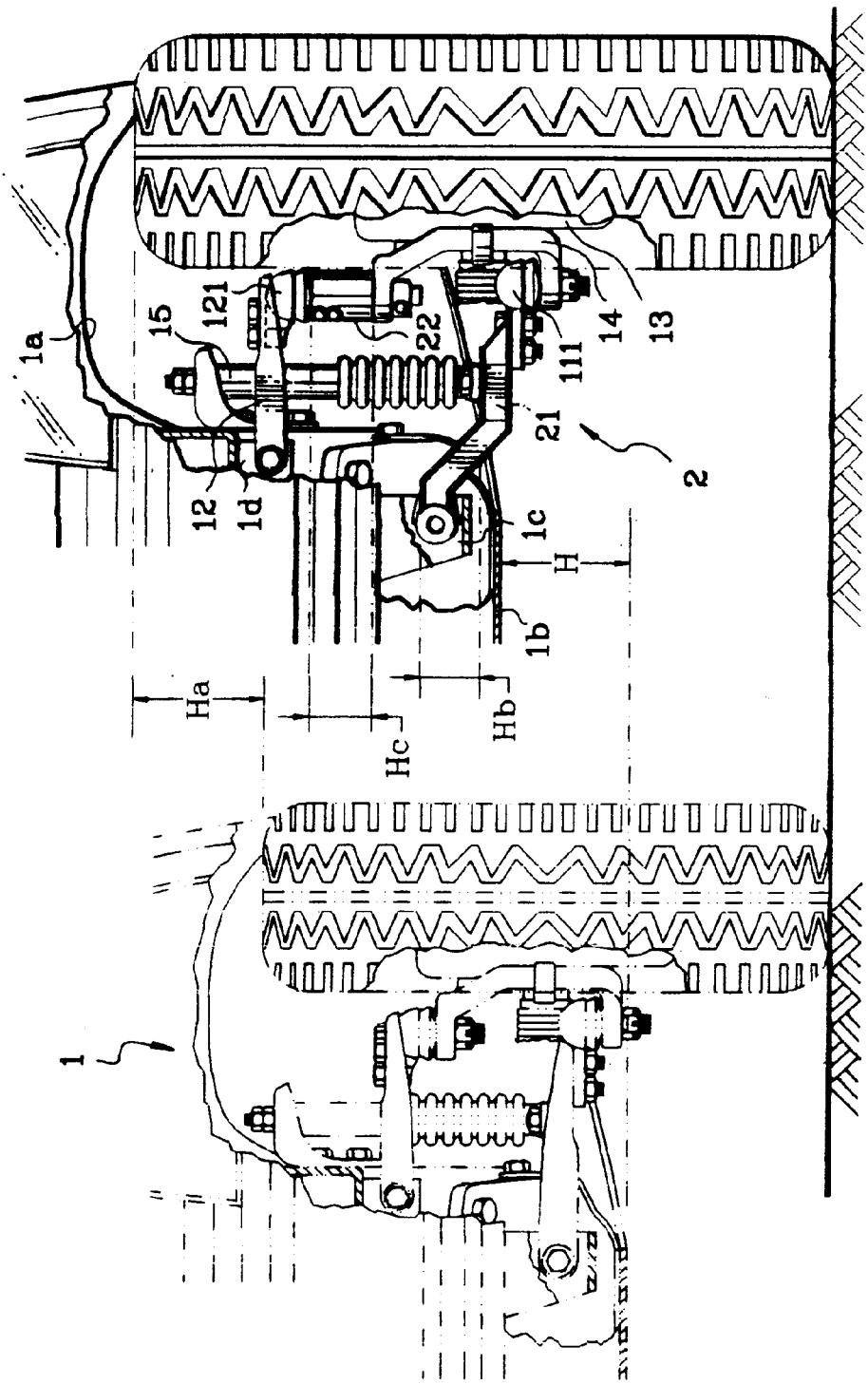
Figure 2B:
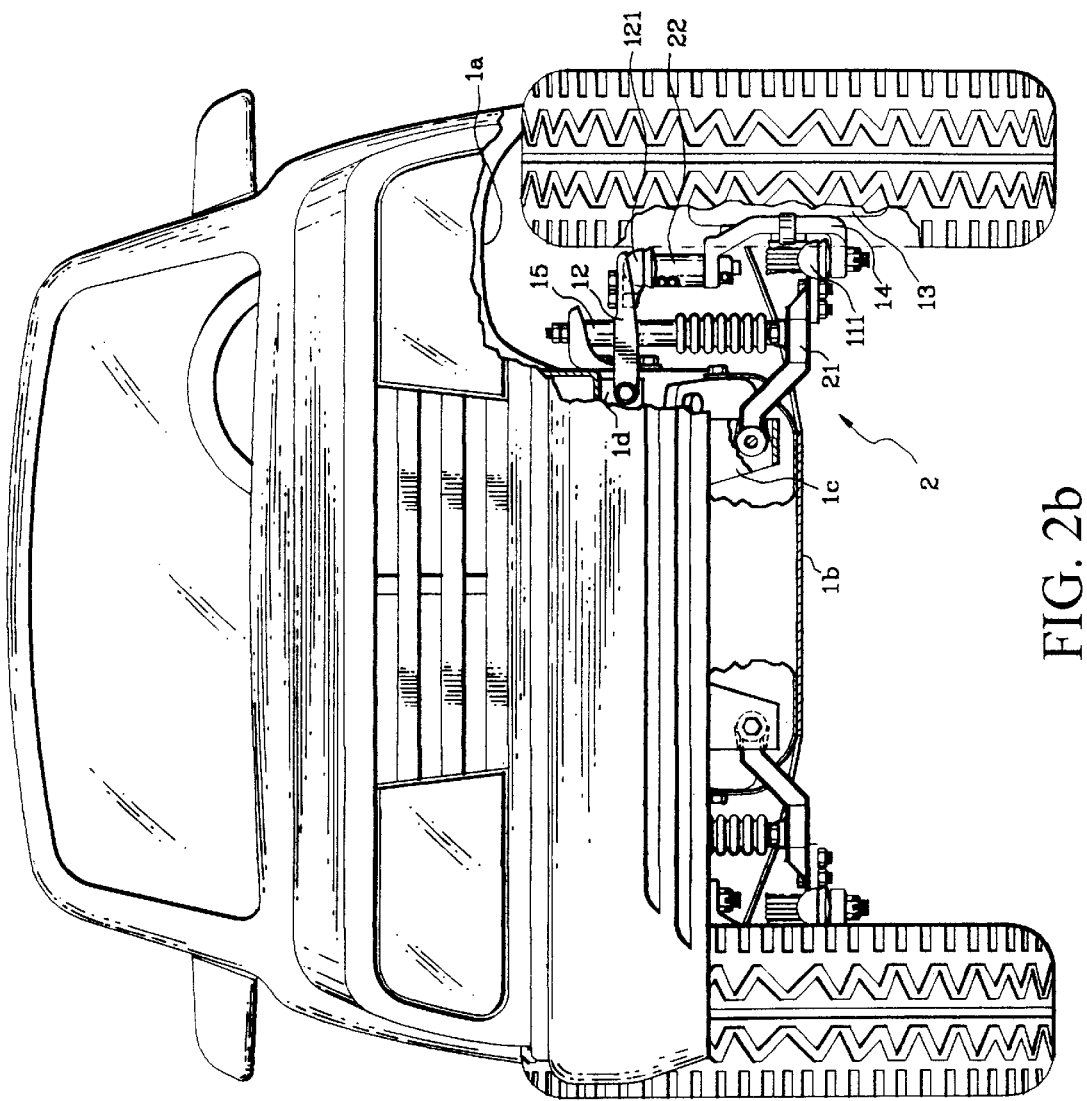
Figure 3A:
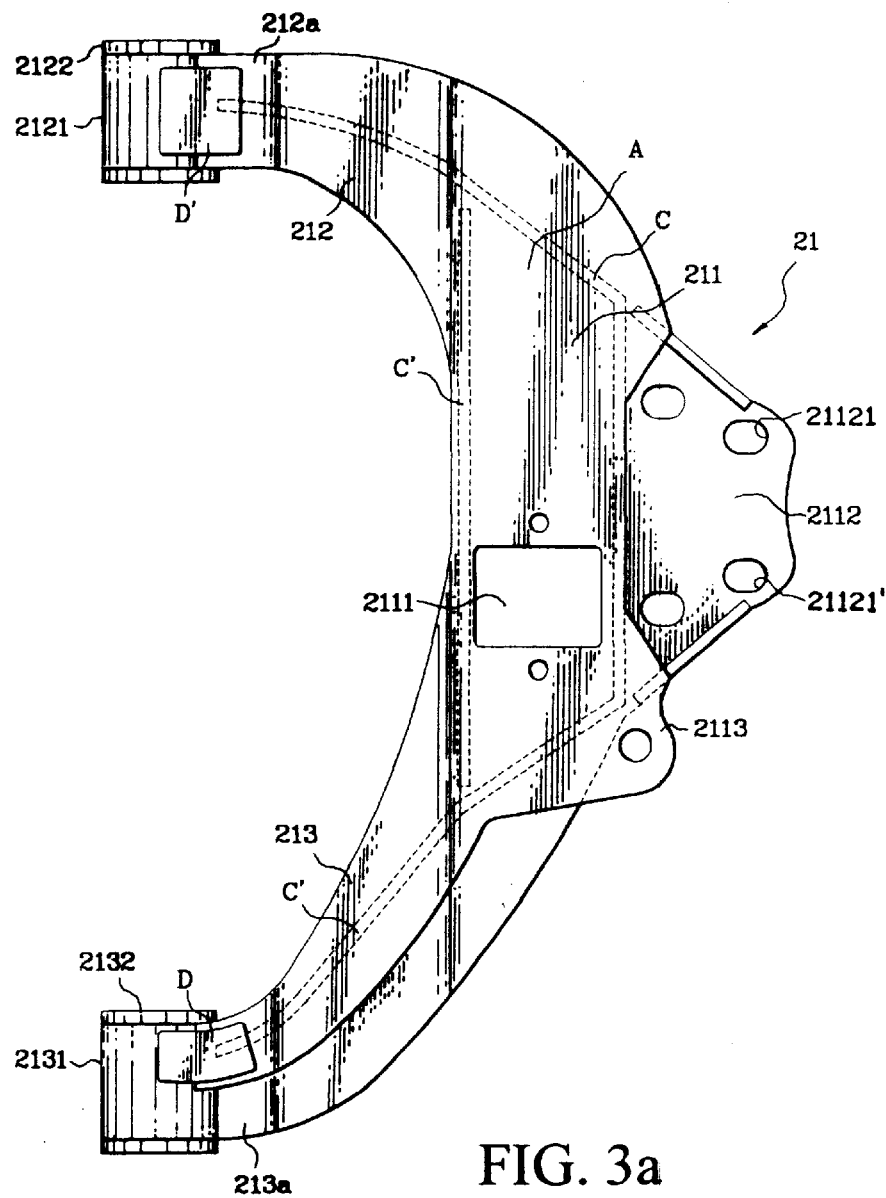
FIG. 3a is a plan view of a lower triangle frame according to this invention.
Figure 3B:
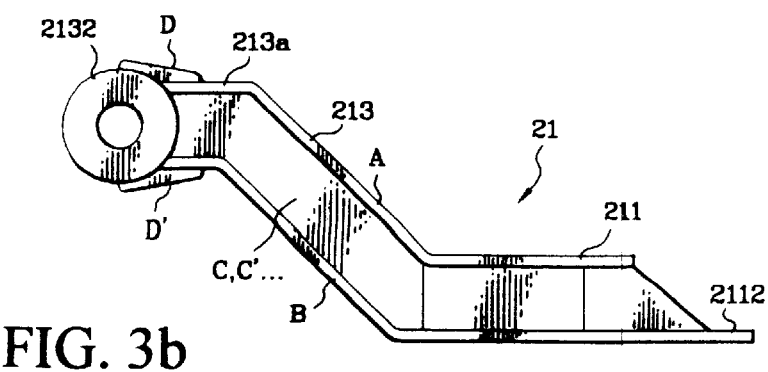

Firstly, referring to FIGS. 2a and 2b, a front wheel double suspension triangle frame for four-wheel drive automobile according to this invention for raising the automobile body and the chassis is symmetric in the arrangement of the right and left wheels, and for brevity the right wheel is taken as an example in description. Referring to FIGS. 2a, 2b, 3a and 3b, this invention comprises a lower triangle frame 21 bent from the right side to the left side to form a Z shaped double layered step-like structure. On one side of a lower triangle frame 21 is provided a seat having a rectangular hole 2111 and a plurality of screw holes to connect with the lower end of a shock absorber 15. A groove 2112 is provided on the outer end of the lower triangle frame 21 and a plurality of oval screw holes 21121, 21121' are provided on the end face thereof for a steering joint 111 to be pivotally connected thereon whereby the front wheel may be precisely aligned through these screw holes 21121, 21121'. The inner end of the end face 211 of the lower platform is provided with a short ratchet arm 212 and a long ratchet arm 213 both of which extend obliquely upward at the same angle to form an end face 212a, 213a. Upper platform longitudinal bushes 2121, 2131 are secured on the end of the end faces 212a, 213a of the upper platform, while flexible pads 2122, 2132 are sleeved on the end thereof to pivotally connect with the automobile body and chassis. A projection 2113 and screw holes are provided on the outer side of a base portion of the long ratchet arm 213 to pivotally connect with a balancing rod. As disclosed above, the lower triangle frame 21 is formed by precisely cutting a steel plate of upper layer A, a steel plate of lower layer B and a plurality of longitudinal steel plates c,c' by means of laser and soldering them into an H shaped structure and furthermore the section of the lower platform 211 being in a case structure. Rectangular steel plates D, D' are soldered on the joining portion of the upper and lower end face thereof for reinforcement whereby a better rigidity and flexibility than the conventional one is obtainable.

As shown in FIGS. 4 and 5, this invention further comprises a spacer 22 having an axle body 221 the height of which is equal to the height between the upper and lower platform of the lower triangle frame 21. A longitudinal cutting face is formed on the outer portion of the axle body 221 of the spacer 22. A circular hole 222 is bored at the center of the upper end face of the axle body 211 to receive a projecting axle 1211 of the steering joint 121. On the side opposite to the longitudinal cutting face a slot 224 cutting through the wall thickness is provided. Concave faces 2211 and 2211' are respectively formed on the upper corners on both sides of the slot 224, and a plurality of screw holes are provided on the concave faces 2211, 2211'. A plurality of screws 225, 225' fasten the projecting axle 1211 of the steering joint 121 within the circular hole 222 wherein the threaded shaft of the screw 225 inserts into a groove 1211a on the circumference of the projecting axle 1211. A projecting axle 223 extends from the center of the lower end face of the axle body 221 and a groove 223a is provided on the circumference of the lower portion of the projecting axle 223. After the projecting axle 223 passes through the hole bored on an upper seat 142 of the spindle knuckle 14, a fastener 226 is fastened on the lower end of the projecting axle 223 by means of a screw 227 and a threaded shaft 2271 of the screw 227 is inserted into the groove of the projecting axle 223.

Referring to FIGS. 2b and 6, means for raising the automobile and the chassis 2 is described as follows. The lower platform 211 of the lower triangle frame 21 is connected with the lower end of the shock absorber 15. The outer end of the lower triangle frame 21 is secured onto the steering joint 111 of the lower seat on the spindle knuckle 14 of the hub 13, while the inner end thereof extends obliquely upward at an angle of elevation to raise the chassis 2 which is pivotally connected with the seat 1c of the beam. The spacer 22 is pivoted between the steering joint 121 on the outer end of the upper triangle frame 12 and the upper seat 142 on the spindle knuckle 14 of the hub 13. The inner end of the upper triangle frame 12 is pivoted on a seat of the beam of the automobile body so that the upper and lower triangle frame 12, 21 are maintained horizontal whereby they may take the inner end thereof as the axis to swing up and down. Thus, the distance between the upper and lower triangle frame 12, 21 and the automobile 1a is enlarged whereby a wheel having a greater diameter may be used to raise the chassis 1b relative to the road. According to this invention, the height increase in raising the automobile body and the chassis is equal to the height obtained by the increase in diameter of the wheel or the height between the lower and upper platforms of the lower triangle frame added to the height of the spacer.

FIG. 7 shows a spacer 22' according to another embodiment of this invention. Referring to FIGS. 5, 8 and 9, this embodiment is the same as the embodiment as illustrated and disclosed above in structure except that a different pivotal connection is adopted to match with the conventionally integrally formed upper triangle frame 12' and steering joint 121'. As shown, the height of an axle body 221' of a spacer 22' corresponds to the height between the upper and lower platforms of the lower triangle frame 21. A longitudinal cutting face is formed on the outer portion of the axle body 221'. A conical hole 222' and a screw hole 2221' on the lower portion thereof are provided on the upper end face thereof to engage with a conical projecting axle 1211' of the steering joint 221' having a threaded screw shaft 1212' on the lower end thereof. A plurality of through holes 224' are provided through the axis of the axle body 221', and correspondingly a through hole is provided through the lower threaded screw shaft 1212' of the conical projecting axle 1211' of the steering joint 121'. A pin 226 is inserted through the axle body 221' and the threaded screw shaft 1212' for secureness. A conical projecting axle 223' having a threaded screw shaft 2231' on the lower portion thereof extends downward from the center of the lower end face of the axle body 221' in correspondence to a conical hole 1421' of an upper seat 142' on a spindle knuckle 14'. A through hole 2231a' is provided on the middle portion of the threaded screw shaft 2231'. After the conical projecting axle 223' passes through the conical hole 1421' of the upper seat on the spindle knuckle 14, a nut 228 having a groove on one end is used for securing, and a pin 227 passes through the groove of the nut 228 to extend into the through hole 2231a' for secureness.

While this invention is described with the preferred embodiments, it is to be understood that this invention may be practiced otherwise than as specifically described herein without departing from the spirit and scope thereof.

What is claimed is:

1. A front wheel double suspension triangle frame for four-wheel drive automobile comprising:

a lower triangle frame bent from the outside inward to form a Z shaped structure having an upper platform and a lower platform, said lower platform being connected with a lower end of a shock absorber, an outer end of the lower triangle frame being secured onto a first steering joint arranged on a lower seat of a spindle knuckle of a hub, a short ratchet arm and a long ratchet arm being connected with an inner end of the lower platform extending obliquely upward at the same angle of elevation and being connected with said upper platform;

an upper triangle frame above the lower triangle frame having an inner end pivotally connected with a seat of the automobile body; and a spacer having a height between upper and lower ends thereof equal to the height difference between the upper and lower platforms of the lower triangle frame, the upper end of the spacer being pivoted beneath an outer end of the upper triangle frame on a second steering joint, the lower end being connected with an upper seat of the spindle knuckle of the hub whereby the upper and lower triangle frames are horizontal.

2. The front wheel double suspension triangle frame for four-wheel drive automobile as defined in claim 1, wherein on one side of the lower platform of the lower triangle frame there is provided a rectangular hole and a plurality of screw holes for connecting with the lower end of the shock absorber.

3. The front wheel double suspension triangle frame for four-wheel drive automobile as defined in claim 1, wherein on an outer end of the lower platform of the lower triangle frame a seat having a groove is formed, and a plurality of oval screw holes are provided on an end face thereof for said first steering joint to be pivotally connected therewith.

4. The front wheel double suspension triangle frame for four-wheel drive automobile as defined in claim 1, wherein a projection and a screw hole are provided on the lower platform of said lower triangle frame outside of the base portion of the long ratchet arm for a balancing rod to connect therewith.

5. The front wheel double suspension triangle frame for four-wheel drive automobile as defined in claim 1, wherein the ends of the long ratchet arm and the short ratchet arm are respectively provided with an axle, and a flexible pad is sleeved on the inner rim of the axle bushing.

6. The front wheel double suspension triangle frame for four-wheel drive automobile as defined in claim 1, wherein the lower triangle frame is formed with an upper steel plate, a lower steel plate and a plurality of longitudinal steel plates forming an H shaped structure, wherein said lower platform is a case shaped structure.

7. The front wheel double suspension triangle frame for four-wheel drive automobile as defined in claim 5, wherein the upper and lower end faces on which the ends of the two ratchet arms and the axle bushes connect with each other are reinforced by soldering thereon a plurality of steel plates.

8. The front wheel double suspension triangle frame for four-wheel drive automobile as defined in claim 1, wherein said spacer includes an axle body on the outer portion of which is formed a longitudinal cutting face, a circular hole is formed on the upper end face of the axle body to receive a projecting axle of said second steering joint, and a projecting axle extends downward from the center of the lower end face of the axle body for connection on the upper seat of the spindle knuckle.

9. The front wheel double suspension triangle frame for four-wheel drive automobile as defined in claim 8, wherein a slot cutting through the wall thickness is formed on the side opposite to the longitudinal cutting face of the axle body of said spacer, a concave face is provided on both sides of the slot having a plurality of screw holes on the inner and outer sides of the concave face, and at least one screw is provided to fasten the projecting axle of the second steering joint within said circular hole.

10. The front wheel double suspension triangle frame for four-wheel drive automobiles as defined in claim 9, wherein upon fastening said screw, the threaded shaft of the screw on the inner side is inserted in a groove on the circumference of the projecting axle of the second steering joint.

11. The front wheel double suspension triangle frame for four-wheel drive automobile as defined in claim 8, wherein a groove is formed on the circumference of the lower portion of the projecting axle of said spacer, the projecting axle extends through a hole formed on the upper seat of the spindle knuckle, a fastener is fastened on the lower end of said projecting axle by means of a screw, and said screw is secured onto said projecting axle through the insertion of the threaded shaft of the screw into said groove.

12. The front wheel double suspension triangle frame for four-wheel drive automobile as defined in claim 1, wherein said spacer includes an axle body on the outer portion of which a longitudinal cutting face is formed, a conical hole is formed on the center of the upper end face of the axle body and a threaded hole is formed beneath the conical hole for receiving therein a conical projecting axle of said second steering joint having a threaded shaft extending therebelow, and a conical projecting axle extends downward from the center of the lower end face of the axle body with a threaded shaft extending beneath the conical projecting axle for connection on the upper seat of the spindle knuckle.

13. The front wheel double suspension triangle frame for four-wheel drive automobile as defined in claim 12, wherein a plurality of through holes are provided passing through the middle portion of the axle body of said spacer, and a pin extends through the axle body for securement to the threaded shaft of the second steering joint.

14. The front wheel double suspension triangle frame for four-wheel drive automobile as defined in claim 12, wherein a through hole is provided on the middle portion of the threaded shaft extending beneath the conical projecting axle extending from the axle body, the conical projecting axle extends through a conical hole on the upper seat of the spindle knuckle, and a nut having a groove on one end is fastened on the lower end of said threaded shaft and secured by extending a pin through the groove of the nut and further through the through hole in the threaded shaft.

* * * * *